No. 822,300. PATENTED JUNE 5, 1906.
O. C. PRASSE.
WASHING APPARATUS.
APPLICATION FILED FEB. 20, 1905.
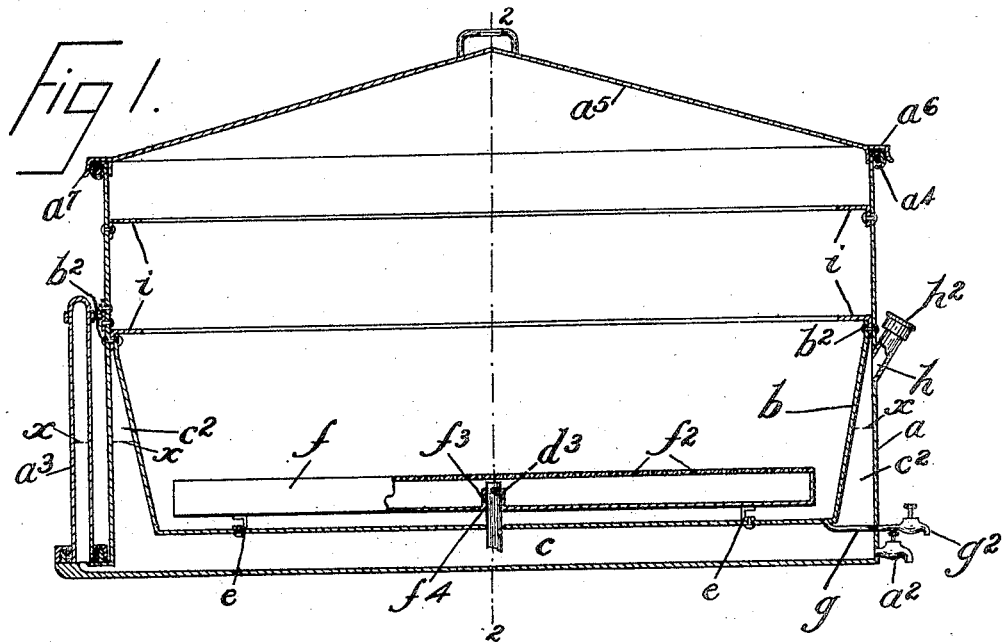
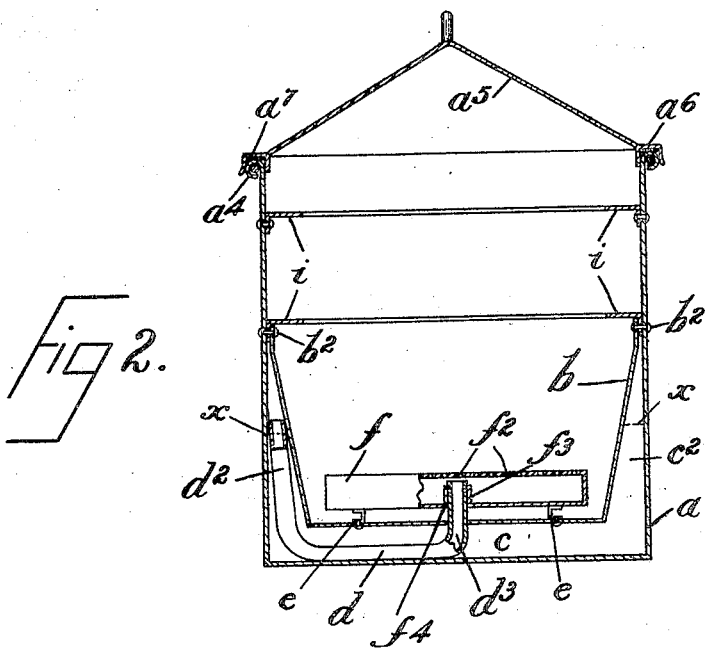
WITNESSES
M. Rader
F. A. Stewart
INVENTOR
Oscar C. Prasse
BY Edgar Tate & Co
ATTORNEYS

UNITED STATES PATENT OFFICE.

OSCAR C. PRASSE, OF WEST BRIGHTON, NEW YORK.

WASHING APPARATUS.

No. 822,300.        Specification of Letters Patent.        Patented June 5, 1906.

Application filed February 20, 1905. Serial No. 246,399.

*To all whom it may concern:*

Be it known that I, OSCAR C. PRASSE, a citizen of the United States, residing at West Brighton, in the county of Richmond and State of New York, have invented certain new and useful Improvements in Washing Apparatus, of which the following is a specification, such as will enable those skilled in the art to which it appertains to make and use the same.

This invention relates to washing apparatus or machines; and the object thereof is to provide an improved apparatus of this class which is simple in construction and operation and which does not involve rubbing or the mechanical agitation of the clothing or other articles to be washed.

The invention is fully disclosed in the following specification, of which the accompanying drawings form a part, in which the separate parts of my improvement are designated by suitable reference characters in each of the views, and in which—

Figure 1 is a longitudinal sectional view of my improved washing apparatus, and Fig. 2 a cross-section thereof on the line 2 2 of Fig. 1.

In the practice of my invention I provide a receptacle $a$, which in the construction shown is oblong in form, but which may be of any desired shape in plan or in longitudinal section, and said receptacle is preferably made of sheet metal and is provided with a draw-off faucet or similar device $a^2$, and at one end or side thereof is a water-gage $a^3$. The receptacle $a$ is also provided with a rolled or beaded top $a^4$ and with a removable cover $a^5$, having a rim $a^6$, which is box-shaped in cross-section and adapted to inclose the rolled or beaded top $a^4$, and in practice a packing-gasket or similar device $a^7$ is placed in the rim $a^6$.

Within the bottom portion of the receptacle $a$ is placed a supplemental receptacle $b$, which is of the same shape in plan or horizontal section as the receptacle $a$. The receptacle $b$, however, is preferably secured in the receptacle $a$, as shown at $b^2$, being riveted or otherwise connected with said receptacle $a$, and the bottom portion of the receptacle $b$ is smaller than the top portion thereof, or, in other words, the side walls of the receptacle $b$ are contracted inwardly and downwardly, and said receptacle $b$ does not extend to the bottom of the receptacle $a$, and by reason of this construction a space or chamber $c$ is formed between the bottom of the receptacle $b$ and the bottom of the receptacle $a$, and this space or chamber $c$ extends upwardly around the receptacle $b$, as shown at $c^2$.

Located in the space or channel $c$ in the bottom of the receptacle $a$ and preferably secured therein is a tube $d$, one end $d^2$ of which extends upwardly at one side of the receptacle $b$ into the top portion of the part $c^2$ of the chamber or receptacle $c$, and the other end of the tube $d$ is bent upwardly, as shown at $d^3$, and passes through the bottom of the receptacle $b$.

Within the bottom portion of the receptacle $b$ and resting on supports $e$ is a steam-box $f$, the top portion of which is perforated, as shown at $f^2$, and the steam-box $f$ is provided centrally of the bottom thereof with an opening $f^3$, through which the end $d^3$ of the tube $d$ passes, and the upper end of the tube $d$ is open, and the bottom portion of the receptacle $f$ is also preferably provided with a sleeve or collar $f^4$, through which the end $d^3$ of the tube $d$ passes.

The receptacle $b$ is also provided at one end or side thereof with a draw-off pipe or similar device $g$, having a discharge-faucet $g^2$, and the receptacle $a$ is provided with a filling-spout or opening $h$ at one side or end thereof, and said filling spout or opening is provided with a removable cap or cover $h^2$. The receptacle $a$ is also provided in the form of construction shown with deflector-plates $i$, which are secured therein above the supplemental receptacle $b$ and which extend entirely around the inner walls of the receptacle $a$.

In practice the clothes or other articles to be washed are first immersed and soaked in a strong soap-suds or in a strong solution of soap and water, consisting, preferably, of one bar of soap to three or four gallons of water, and after having remained in said solution for a period of several hours are placed into the supplemental receptacle $b$. The chamber or space $c$ in the receptacle $a$ is also filled with water up to about the point indicated by the dotted lines $x$ in Figs. 1 and 2. The apparatus is then placed on a suitable heater, or heat is applied thereunder, and this causes steam to be generated in the top $c^2$ of the chamber or space $c$, and this steam passes through the tube $d$ into the steam-box $f$ and passes out through the perforations in the top of said box and into the clothes or other articles to be washed, and this process of steaming is continued for a period of an hour or so, after which the clothes or other articles are taken out and thoroughly rinsed in clean water, hot water being preferred, after which the said clothes or other articles may be rinsed in cold water, if desired. In the foregoing operation the dirt is first loosened and dissolved by the solution of soap and water, and the steaming of the clothes or other articles in the receptacle $b$ in the manner herein described thoroughly separates all dirt and other foreign substances from the clothes or other articles. It will be understood that during the process of steaming the receptacle $a$ is closed by the cover $a^5$, and the baffle-plates $i$ prevent the steam from passing up along the side walls of the receptacle $a$ and causes the steam to remain in the central portion of said receptacle.

The steam-box $f$ may be removed for the purpose of cleaning whenever desired, and in this way the said steam-box and the bottom of the receptacle $b$ may be thoroughly cleaned whenever necessary, and it will be understood that the water in the receptacle $a$ may be drawn off whenever desired, as may also the water in the receptacle $b$.

My improved washing apparatus is simple in construction and operation and comparatively inexpensive and may also be used for other purposes, such as for steaming clams, oysters, and the like.

Having fully described my invention, what I claim as new, and desire to secure by Letters Patent, is—

In an apparatus of the class described, a main receptacle having a removable cover, a supplemental receptacle placed in the bottom portion of the main receptacle and the top of which fits the inner walls of the main receptacle and the bottom of which is of less dimensions than the main receptacle and above the bottom of the main receptacle, a perforated steam-box placed in the bottom portion of the supplemental receptacle and a tube one end of which opens into the steam-box and the other end of which opens between the said receptacles and above the bottom of the supplemental receptacle, substantially as shown and described In testimony that I claim the foregoing as my invention I have signed my name, in presence of the subscribing witnesses, this 18th day of February, 1905.

OSCAR C. PRASSE.

Witnesses:
F. A. STEWART,
C. E. MULREANY.